(12) United States Patent
Link (10) Patent No.: US 6,199,312 B1
(45) Date of Patent: *Mar. 13, 2001

(54) FILAMENTARY RATTLE BANDING COLLAR

(76) Inventor: Donald J. Link, 1053 Legion St., Shakopee, MN (US) 55379

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,952

(22) Filed: Nov. 20, 1998

(51) Int. Cl.⁷ .................................................. A01K 85/00
(52) U.S. Cl. ...................... 43/42.24; 43/42.28; 43/42.31
(58) Field of Search ................. 43/42.24, 42.25, 43/42.28, 42.29, 42.31, 42.3, 42.37, 42.38

(56) References Cited

U.S. PATENT DOCUMENTS

| | | | |
|---|---|---|---|
| 2,935,810 | * | 5/1960 | Giguere . |
| 5,426,886 | * | 6/1995 | Stanley ................................. 43/42.31 |
| 5,499,471 | * | 3/1996 | Foutch ................................. 43/42.31 |
| 5,517,782 | * | 5/1996 | Link ..................................... 43/42.31 |
| 5,524,378 | * | 6/1996 | Hood .................................... 43/42.31 |
| 5,524,379 | * | 6/1996 | Hood .................................... 43/42.31 |

OTHER PUBLICATIONS

Steve Quinn, Bass Jigs and Beyond, The In Fisherman, vol. 19 No. 2, pp. 6,76–83 (Mar. 1994) with enlarged color copy of p. 82.
Steve Quinn, Rigging Wrinkles That Turn Tough Bass, The In Fisherman, vol. 19 No. 2, pp.6, 78–87 (May–Jun. 1994) with enlarged color copy of p. 82.
1993 Stanley Jigs catalog, cover page and pp. 2,12 USA.

* cited by examiner

Primary Examiner—Peter M. Poon
Assistant Examiner—Judith A. Nelson
(74) Attorney, Agent, or Firm—Altera Law Group, LLC (57) ABSTRACT

A banding collar for a banded skirt or a core piece for a rollup skirt that includes a number of straps that radiate from a bored hub or core piece and include one or more holders that accept detachable rattles and other fish attractants. Each strap may include a number of bored hubs that support additional rattle holders, scent pods or other attractants. An alternative core piece for a rollup skirt having a number of straps and rattle holders is also disclosed. The rattle and/or skirt strands can include curlicue tailpieces and the strands, straps and holders can be formed to a variety of shapes.

16 Claims, 7 Drawing Sheets

FILAMENTARY RATTLE BANDING COLLAR

BACKGROUND OF THE INVENTION

The present invention relates to fishing lures and, in particular, to a banding collar for multi-stranded, elastomer skirts having filaments that radiate from the collar and support a number of rattles.

A dressing commonly mounted to fishing lures, for example, jigs, spinner baits and/or buzz baits, is a multi-stranded skirt. The skirts are typically fabricated from sheets of an elastomer material, such as natural rubber or silicone rubber. A sheet is partitioned into a number of regions that are processed into individual skirts. Each skirt is defined by a multiplicity of slits that form strands. The strands are attached between solid bands that border the ends of the strands. The skirts are cut from the sheets with the borders attached. The strands are contained by the borders, until the strands are bound together. A rubber band typically secures the strands together.

The rubber band is also used to attach the bound skirt to an appendage of a fishing lure. One or more skirts having the same or different colors and or surface treatments can be attached to a lure. As the lure is retrieved, the strands or filaments undulate with movement of the lure through water to entice a fish to strike.

Examples of banded skirts can be found at U.S. Pat. Nos. 4,640,041 and 5,251,395.

Examples of another skirt style or "rollup" skirt are shown at U.S. Pat. Nos. 5,517,782 and 5,709,047. Rollup skirts are formed by rolling and bonding the border of a skirt to a tubular, elastomer core piece with an appropriate adhesive. The cut ends of the strands trail from the core piece. A bore in the core piece stretches and mounts to the lure.

The core of the U.S. Pat. No. 5,709,047 patent also includes ears or projections that support small rattles. The sound produced by the rattles enhances the fish attracting qualities of the skirt. The close fitting ears, however, limit the freedom of motion of the rattles and thereby the produced sound.

U.S. Pat. Nos. 5,426,886 and 5,524,378 disclose jig type lures that include rattles that are mounted to filaments that trail from the lure. The rattles of the U.S. Pat. No. 5,426,886 patent provide a stem that supports a sound chamber and bead. The stem mounts beneath the band of a typical skirt. With protracted use, the stem and rattles can be dislodged from the band. The rattles of the U.S. Pat. No. 5,524,378 patent provide similar rattles, however, the flexible arms are permanently molded into the head of the lure and can break off with normal use.

To overcome the latter deficiencies, the present invention provides an improved banding collar for a banded skirt and an improved core piece for a rollup skirt that are outfitted with one or more straps that accept detachable rattles. The rattles mount to holders and/or bored hubs that are along the straps. Curlicue tailpieces can be separately attached to the rattles or to individual strands of an associated multi-stranded skirt. The number and shape of the straps can be varied and multiple bored hubs can be formed into the straps.

SUMMARY OF THE INVENTION

It is a primary object of the invention to provide a banding collar or core piece for multi-stranded rollup skirts that includes a number of straps that trail from a bored collar or core piece and support one or more rattles.

It is a further object of the invention to provide a collar or core piece having multiple rattle holders displaced over the length of integral staps that radiate from a central hub or core.

It is a further object of the invention to provide a curlicue tailpieces that mount to the rattles or to strands of an associated multi-stranded skirt.

Various of the foregoing objects, advantages and distinctions of the invention are obtained in a presently preferred banding collar for a banded skirt and core piece for a rollup skirt that in one construction includes a pair of integral straps. Each strap has a holder that accepts a detachable rattle. A curlicue tailpiece can be secured to the rattle. The curlicue tailpiece can also be secured to strands that extend from the skirt. Each strap may include multiple rattle holders and/or hubs.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
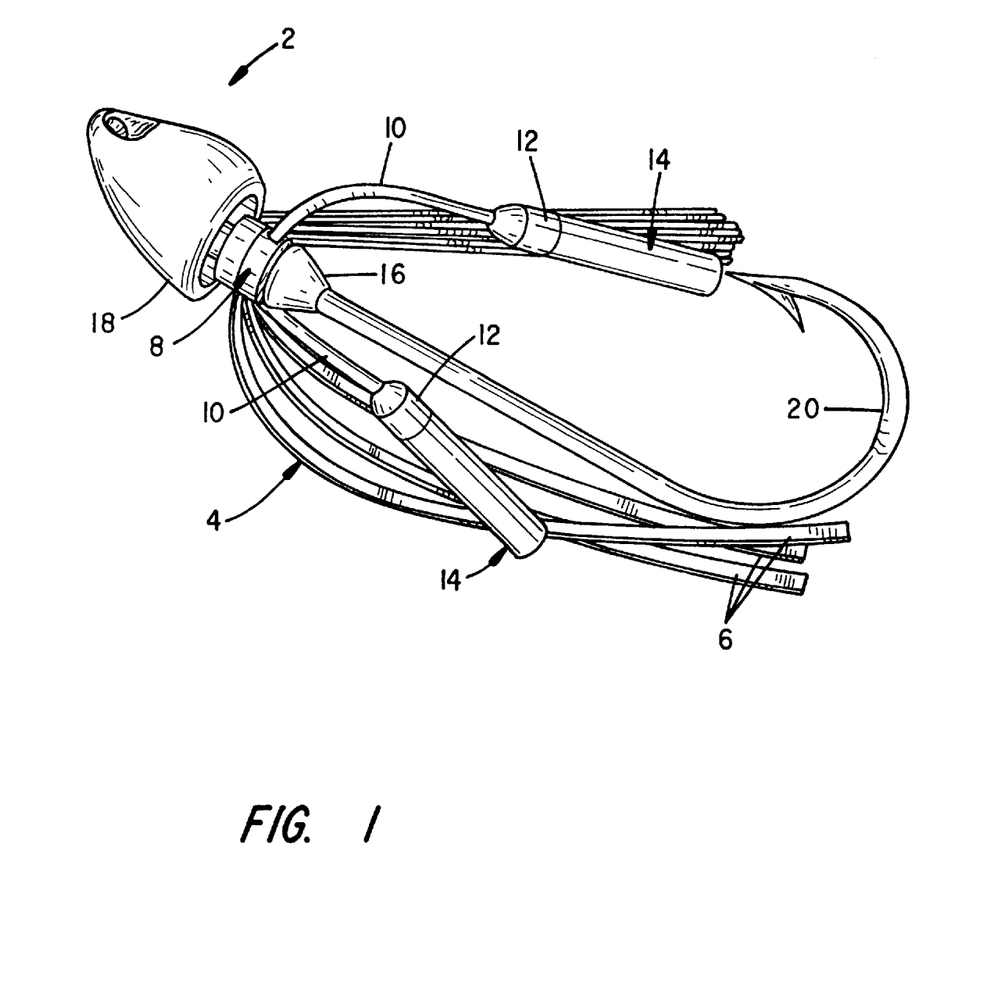
FIG. 1 is a perspective drawing to a jig bait fitted with a filamentary rattle banding collar of the invention.

Referring to FIG. 1, a perspective drawing is shown to a lure 2, for example, a typical jig bait that is fitted with a skirt 4. The skirt 4 includes a number of strands 6. The strands 6 are bound together with a band or collar 8. Separately trailing from the collar 8 are filaments or straps 10. Rattle holders 12 are formed into the distal ends of the straps 10 and rattles 14 are mounted to each holder 12. The rattle holders 12 thus undulate with the strands 6 as the lure 2 moves through water. Details to the construction of the banding collar 8 and alternative collar constructions are discussed with respect to FIGS. 2 through 6 below.

Figure 7:
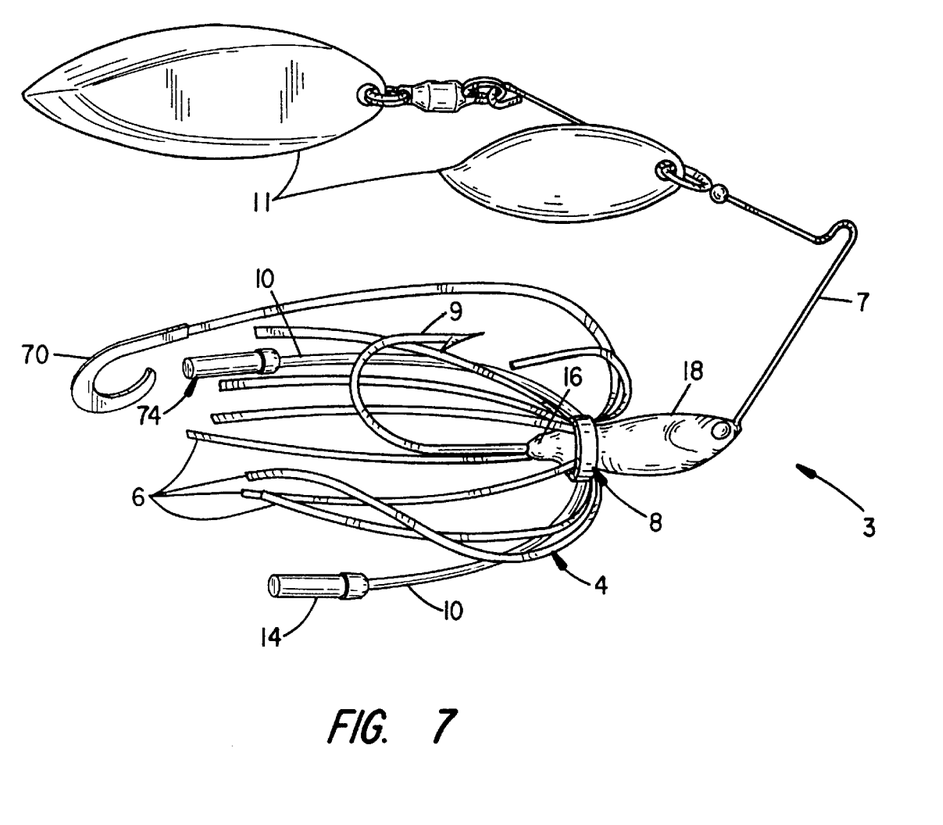
FIG. 7 is a perspective drawing to a spinner bait fitted with a filamentary rattle banding collar of the invention.

The lure 2 alternatively can be a spinner-bait 3, reference FIG. 7. Spinner baits typically include a weighted-head 5 that is molded around a formed wire 7 and a hook 9. Spinner blades 11 of various types are mounted to the formed wire 7.

The number, coloration and/or surface ornamentation of the skirt strands 6 and straps 10 at the collar 8 can be varied as desired. The length and shape of the strands 6 and straps 10 can also be varied. The skirts 4 are preferably formed from an elastomer material, such as silicone rubber, although could be constructed from other materials, such as natural rubber, plastic or various polymers or composites.

The collar 8 is also typically formed from an elastomer material, such as silicone rubber, although could be constructed from other materials. Preferably, the fastener portion of the collar 8 is elastic so that it can expand and contract to secure the skirt 4 to the contours of an appendage 16 of the lure head or body 18. The strands 6 and straps 10 thereby hide a hook 20 that projects from the appendage 16.

Figure 2:
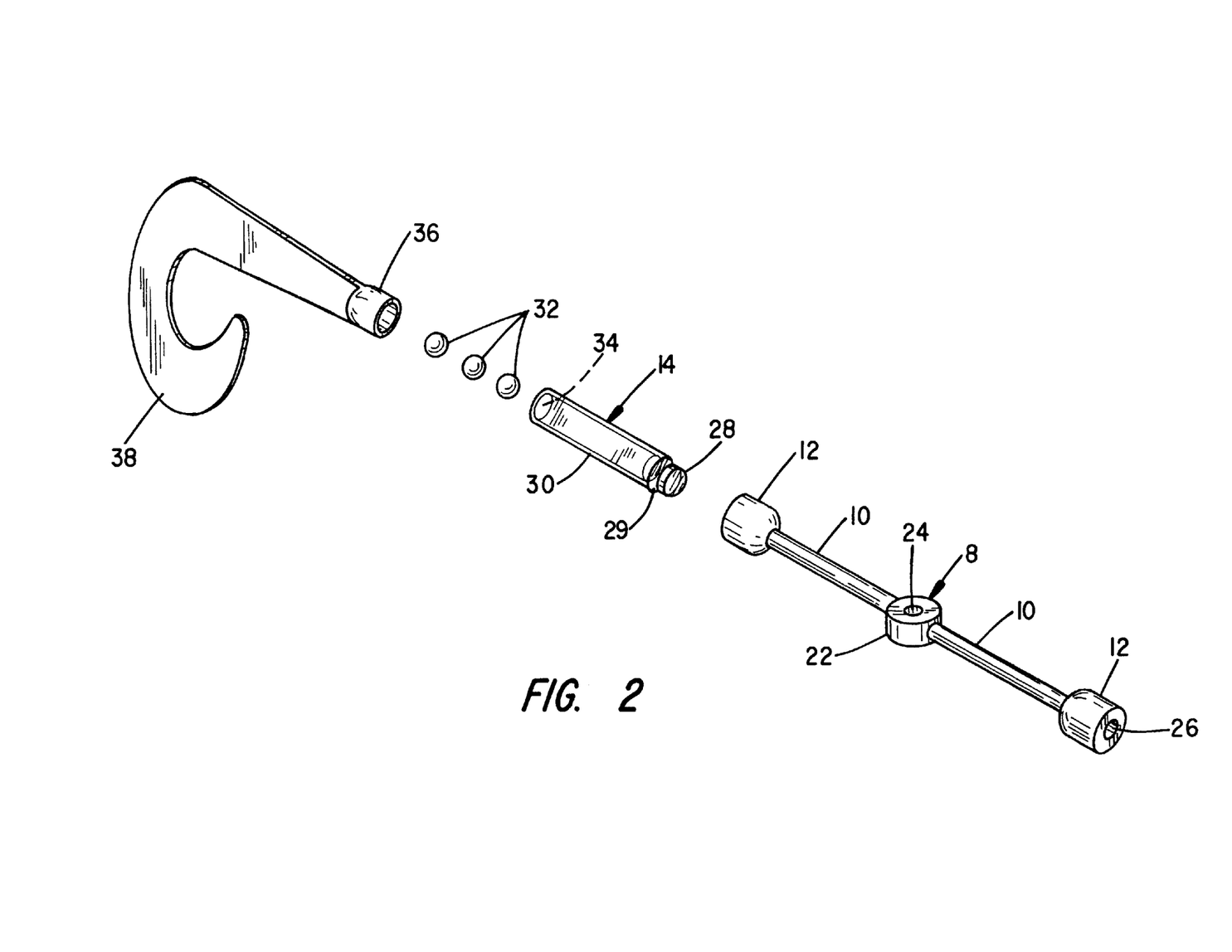
FIG. 2 is an exploded assembly view of a rattle collar and curlicue tail.

With additional attention to FIG. 2, an exploded assembly drawing is shown to the collar 8 and one of the rattles 14. The straps 10 and holders 12 radiate from a central hub 22 that has a longitudinal bore 24. The appendage 16 mounts through the bore 24. A cavity or bore 26 at each holder 12 separately receives a head 28 that protrudes adjacent a groove 29 of a hollow housing 30 of the rattle 14. A number of beads 32 mount in the housing 30 and an open end 34 is sealed with a cap 36. One of the beads 32 or other end cap can alternatively be bonded to the housing 30 to seal the end 34.

Figure 8:
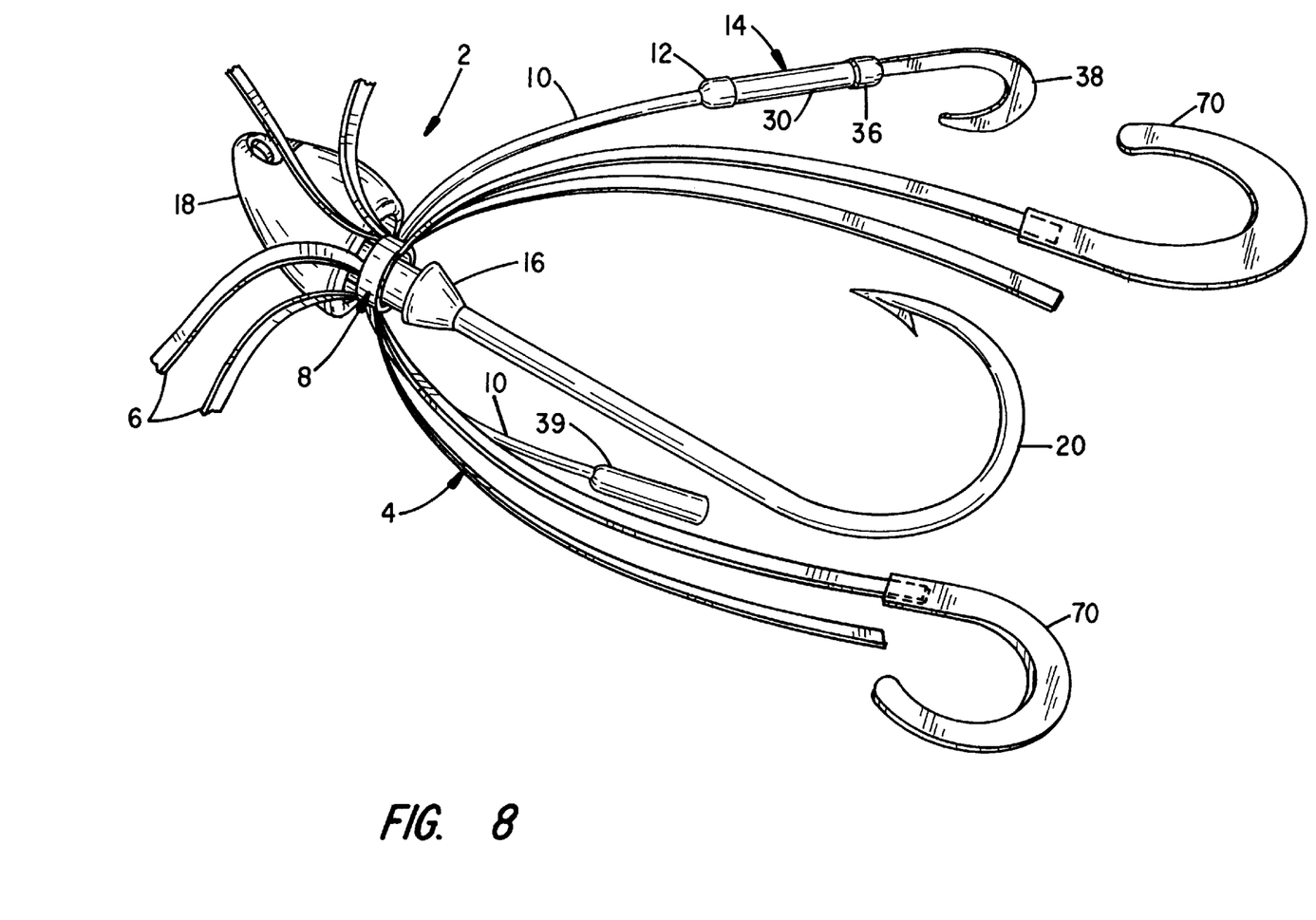
FIG. 8 is a perspective drawing to a jig bait fitted with a filamentary rattle banding collar and wherein curlicue tails are mounted to the skirt strands.

The cap 36 includes a curlicue tail 38 that accentuates movement of the straps 10 to increase the sound produced by the rattle 14. The cap 36 can be formed without a tail 38 and/or the holders 12 can be formed with a longer body that receives the beads 32. In this regard, FIG. 8 shows a banding collar 8 that supports an exemplary, elongated elastomer holder 39 that contains a number of beads 32.

Figure 3:
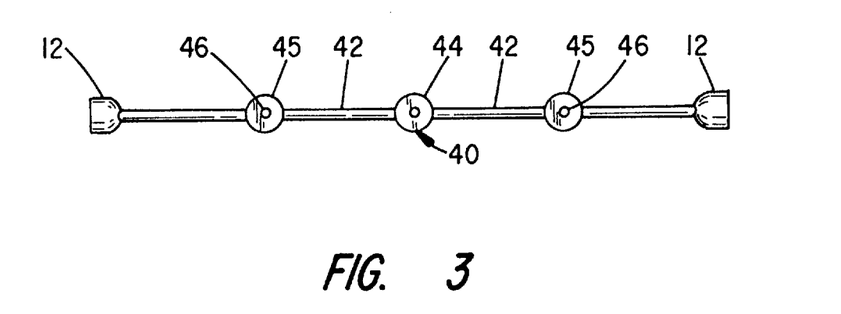
FIG. 3 is a view of an alternative rattle collar having filaments that are able to support multiple rattles.

FIG. 3 shows an alternative construction of a collar 40. Straps 42 radiate from a center hub 44 and the end of each strap 42 includes a holder 12. A secondary or intermediate hub 45 is formed along each of the straps 42. A rattle 14 can be mounted to each holder 12 and/or to a bore 46 of each of the intermediate hubs 45. The sounds and vibrations emanating from a lure 2 fitted with the collar 40 can be varied as desired by provisioning the collar 40 with sufficient rattles 14.

The hubs 44 and/or 45 can also support scent pods, which can comprise a housing 30 that is filled with a scented material that dissolves over time. It is to be appreciated additional straps 10 or 42 can radiate from the hubs 22 and 44 and that any number of hubs 22 and 44 or holders 12 can be included at the straps 10 or 42.

Figure 4:
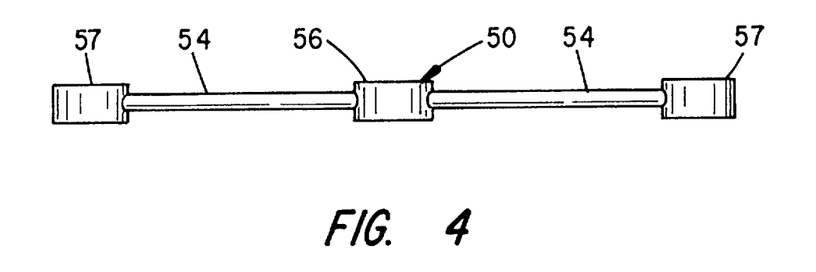
FIG. 4 is a front view of a rattle collar having open ended rattle holders.
Figure 5:
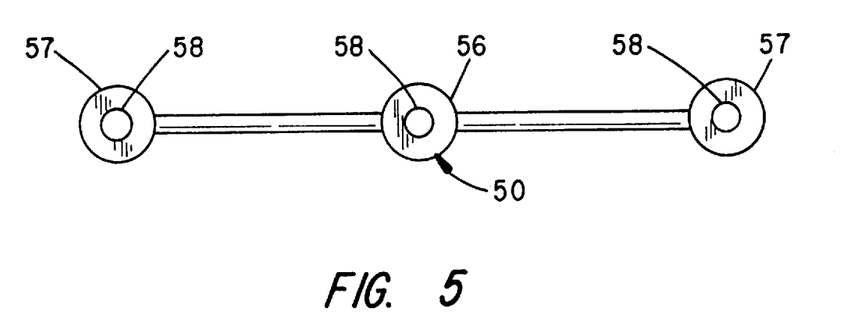
FIG. 5 is a top view of the rattle collar of FIG. 4.

FIGS. 4 and 5 show an alternative collar 50 that can be secured to a lure 2. The collar 50 has a pair of straps 54 that radiate from a hub 56 and terminate at end hubs 57. Each hub 56 and 57 includes a bore 58 that can support a rattle 14, scent pod or other desired attractant. The number, diameter and thickness of the hubs 56 and 57, size of the bores 58 and straps 54 can be varied as desired.

Figure 6:
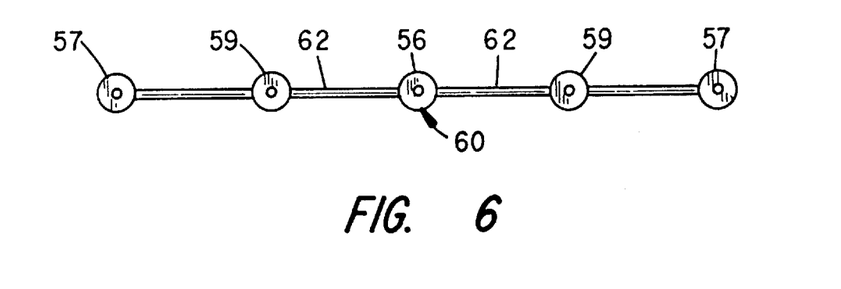
FIG. 6 is a top view of a rattle collar having a number of open ended rattle hubs arrayed over the length of each strap.

FIG. 6 shows a collar 60, similar to the collar 50, that has a pair of straps 62 that include intermediate hubs 59. Depending upon the lure, the hubs 57 and 59 can be outfitted with a variety of appliances to enhance a lure's presentation.

FIGS. 7 and 8 show alternative lures 2 and 3 outfitted with banding collars 8 and different rattle assemblies. That is, FIG. 7 shows rattles 14 that use a bead 32 to seal the open end 34 of the housing 30. FIG. 8, in turn, shows another exemplary rattle 14 that supports an end cap 36 having a curlicue tail 38. The other rattle is constructed from an elongated elastomer holder 39 that supports a number of beads 32.

Figure 10:
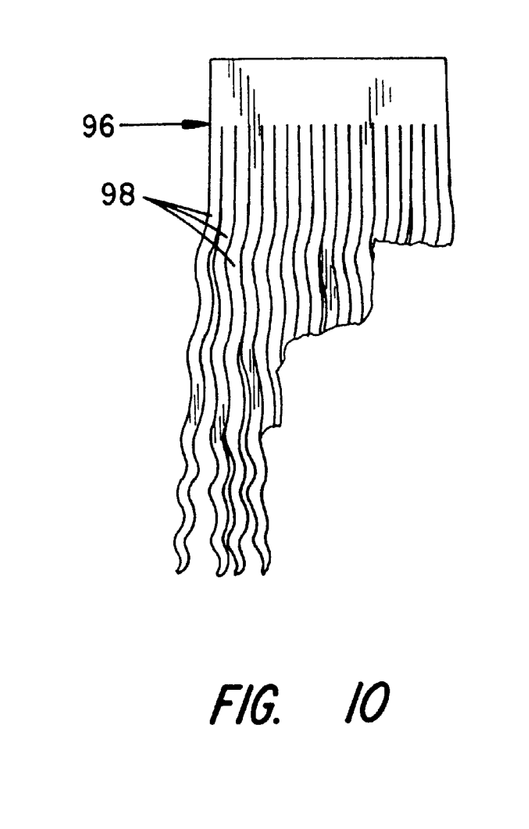
FIG. 10 shows a perspective drawing to a rollup skirt having a number of wavy- shaped strands.
Figure 11:
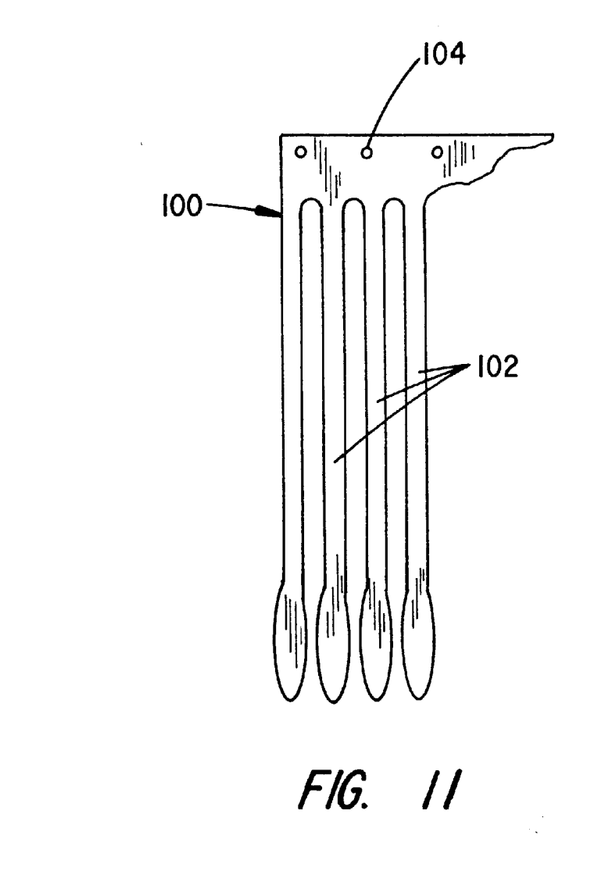
FIG. 11 shows a perspective drawing to a rollup skirt having a number of paddle-shaped strands.

Also attached to selected strands 6 of the skirts 4 of the lures 2 and 3 are individual curlicue tails 70. The tails 70 are formed from silicone rubber and are separately bonded with an adhesive to the strands 6. The tails 70 exaggerate strand movement. The tails 70 might also be formed as part of the strands 6 and examples of which are shown at FIGS. 10 and 11. Similarly, the straps 10 can be shaped to enhance strap movement.

Figure 9:
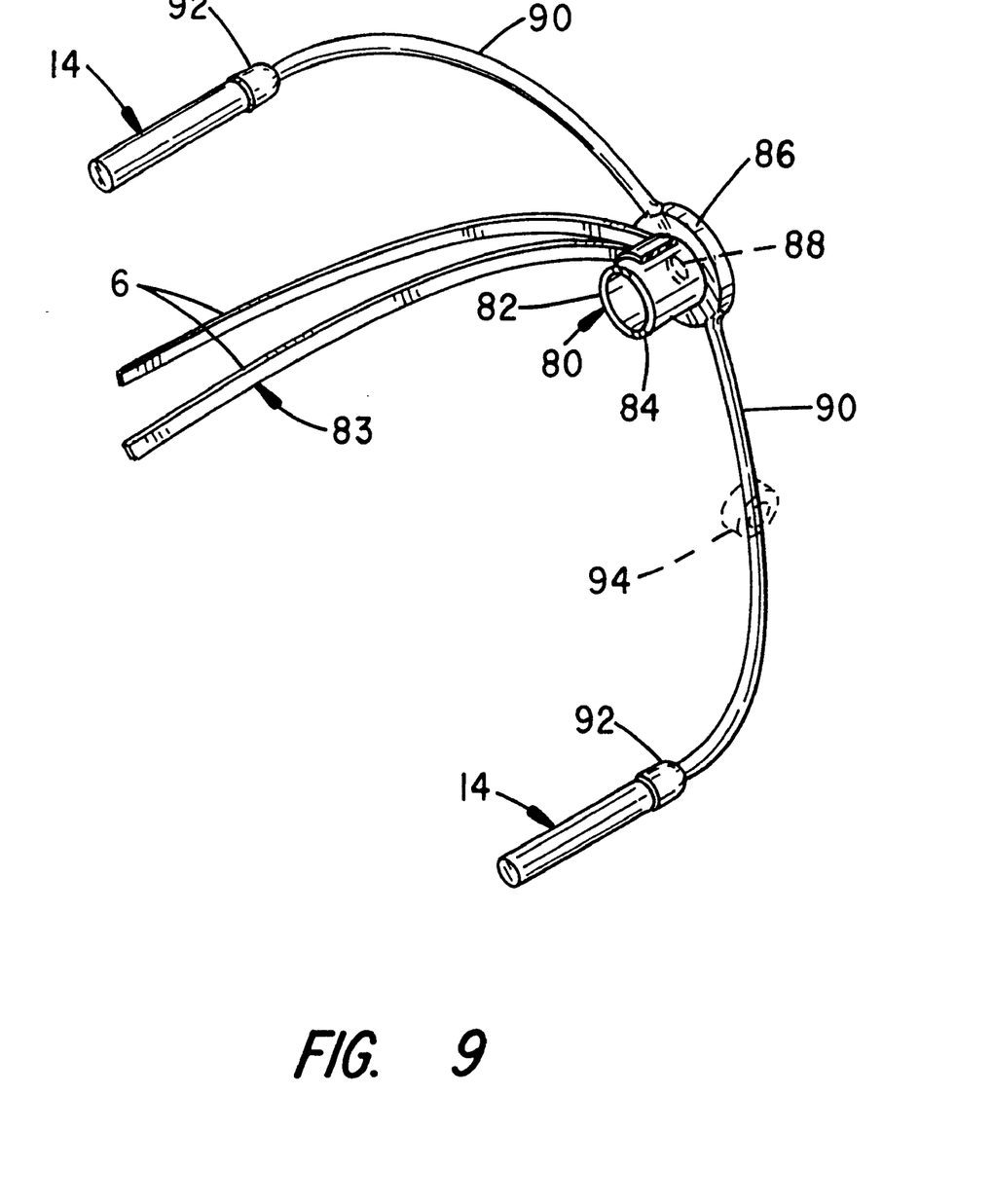
FIG. 9 shows a perspective drawing to a rollup skirt and core piece having a pair of rattle filaments.

Appreciating the general similarities between the core piece of a rollup skirt and the banding collar 8 for banded skirts, FIG. 9 shows an improved rollup skirt 80 that has a core piece 82, similar to the hub 22, and to which a skirt 83 is bonded. The core piece 82 has a cylindrical body 84 and from an end of which a cylindrical head 86 radiates. The head 86 is coaxial to the body 84. The length of the head 86 is substantially shorter than the body 84. A bore 88 extends through the head 86 and body 84. The head 86 induces the strands 6 to flare outward and contains the flow of adhesive used to bond the skirt 4 to the core piece 82.

A pair of straps 90 radiate from the head 86 and support rattle holders 92. Rattles 14 are secured to the holders 92. A number of bored hubs 94 might be distributed over the length of the straps 90 and one of which is shown in dashed line. The number, size and shape of the straps 90 can be varied as desired.

In lieu of affixing curlicue tails 70 to the strands 6, FIG. 10 shows a perspective drawing to a rollup skirt 96 that can be bonded to the core piece 82 and that has a number of wavy-shaped strands 98. FIG. 11 shows a perspective drawing to a rollup skirt 100 having a number of paddle-shaped strands 102. Holes 104 facilitate the construction of the skirt 80. It is to be appreciated the skirts 4, 96 and 100 can be constructed to present strands 6, 98 and 102 having a variety of other shapes that augment the movement of the strands and/or skirt.

While the invention has been described with respect to a preferred construction and considered improvements or alternatives thereto, still other constructions and combinations of the disclosed features may be suggested to those skilled in the art. The foregoing description should therefore be construed to include all those embodiments within the spirit and scope of the following claims.

What is claimed is:

1. An elastomer banding collar for a fishing lure, comprising ii) an annular mounting hub ii) a longitudinal bore that extends through said hub, iii) a filament extending from said hub, iv) a rattle holder that integrally extends from a distal end of said filament, v) a rattle housing including a chamber containing a plurality of beads mounted to said rattle holder such that said bead containing chamber is exposed at said rattle holder and wherein a distal end of said rattle housing mounts in a cavity of a tailpiece that trails from said rattle housing, and vi) a secondary hub having a bore displaced between said mounting hub and said rattle holder and wherein the secondary hub bore extends transverse to the filament.

2. An elastomer banding collar for a fishing lure, comprising i) an annular mounting hub ii) a longitudinal bore that extends through said hub, iii) a filament extending from said hub, iv) a rattle holder that integrally extends from a distal end of said filament, and v) a rattle housing including a chamber containing a plurality of beads mounted to said rattle holder such that the bead containing chamber is exposed at said rattle holder and wherein a distal end of said rattle housing is mounted to a tailpiece that extends from the exposed rattle housing.

3. An elastomer banding collar for a fishing lure, comprising a cylindrical mounting hub having a body and a head, wherein said head integrally projects from one end of said body and a longitudinal bore extends through said head and said body, wherein said head exhibits a diameter greater than said body, wherein said head is shorter than said body, wherein a filament integrally extends from a peripheral surface of said head and includes a rattle holder at a distal end, wherein a rattle is attached to said rattle holder, and wherein a distal end of said rattle housing is mounted to a tailpiece that extends from the exposed rattle housing.

4. An elastomer banding collar for a fishing lure, comprising i) a mounting hub having a body and a head, wherein said head projects from one end of said body and a longitudinal bore extends through said head and said body, wherein said head exhibits a diameter greater than said body, wherein a plurality of filaments extend from a peripheral surface of said head, wherein one of said filaments includes a rattle holder, wherein a rattle housing having a chamber containing a plurality of beads is mounted to said rattle holder, and wherein a tailpiece is mounted to trail from said rattle housing.

5. An elastomer banding collar for a fishing lure, comprising i) a mounting hub having a body and a head, wherein said head integrally projects from one end of said body and a longitudinal bore extends through said head and said body, wherein said head exhibits a diameter greater than said body, and wherein said head is shorter than said body, ii) first and second filaments that radially extend from diametrically opposite sides of said head, wherein said first and second filaments each include a rattle holder that extends from a distal end, wherein a cavity is recessed into each of said rattle holders, wherein said first and second filaments each further include a secondary hub having a bore displaced from said mounting hub and wherein the bore of each of said secondary hubs extends transverse to said first and second filaments, and iii) first and second rattle housings, wherein said first and second rattle housings each have a chamber containing a plurality of beads, wherein said first and second rattle housings respectively mount within the cavity of the rattle holder said first and second filaments and each bead containing chamber is exposed from the rattle holder.

6. A banding collar as set forth in claim 5 including a multi-stranded skirt wrapped around and bonded to a peripheral surface of said body.

7. A collar as set forth in claim 6 wherein said skirt includes a plurality of the strands that exhibit a wavy shape.

8. A banding collar as set forth in claim 5 including a multi-stranded skirt wrapped around and bonded to a peripheral surface of said body.

9. A banding collar as set forth in claim 5 wherein a distal end of one of said rattle housings mounts in a cavity of a tailpiece that trails from said rattle housing.

10. An elastomer banding collar for a fishing lure, comprising ii) an annular mounting hub ii) a bore that longitudinally extends through said hub, iii) a filament extending from a longitudinal peripheral surface of said hub and wherein said filament includes a secondary hub displaced from said mounting hub and having a bore extending transverse to said filament and, iv) a rattle holder extending from a distal end of the filament and wherein said rattle holder includes a recessed cavity that extends parallel to said filament, and iv) a rattle housing having a chamber containing a plurality of beads and wherein said rattle housing is mounted within said cavity such that the bead containing chamber extends external to the rattle holder.

11. A banding collar as set forth in claim 10 including a multi-stranded skirt wrapped around and bonded to a peripheral surface of said hub.

12. An elastomer banding collar for a fishing lure, comprising i) a mounting hub having a body and a head, wherein said head projects from one end of said body and a longitudinal bore extends through said head and said body, wherein said head exhibits a diameter greater than said body, and wherein said head is shorter than said body, ii) first and second filaments that extend from diametrically opposite sides of said head, wherein said first and second filaments each include a rattle holder that extends from a distal end, and wherein a cavity is recessed into each of said rattle holders that extends parallel to each of said first and second filaments, and iii) first and second rattle housings, wherein said first and second rattle housings each have a chamber containing a plurality of beads, wherein said first and second rattle housings mount within the cavity of one of said rattle holders and each bead containing chamber is exposed from the rattle holder and wherein a distal end of one of said first and second rattle housings mounts in a cavity of a tailpiece that trails from the one of said first and second rattle housings.

13. A banding collar as set forth in claim 12 wherein at least one of said first and second filaments includes a plurality of secondary hubs displaced between said mounting hub. adapted to support a rattle.

14. An elastomer banding collar for a fishing lure, comprising ii) an annular mounting hub ii) a longitudinal bore that extends through said hub, iii) a filament that extends from a peripheral surface of said hub, iv) a rattle holder that extends from a distal end of said filament and wherein a cavity is recessed into said rattle holder, v) a rattle housing having a chamber containing a plurality of beads mounted to and exposed from said cavity, and vi) a tailpiece mounted to extend from said rattle housing.

15. A banding collar as set forth in claim 14 wherein said filament includes a secondary hub having a bore displaced between said mounting hub and said rattle holder and wherein the bore of the secondary hub extends transverse to said filament.

16. A banding collar as set forth in claim 14 wherein said mounting hub is cylindrical and includes a body and a head that radiates from said body, wherein said head exhibits a diameter greater than said body and wherein said head is substantially shorter than said body.

* * * * *